Sept. 20, 1966  R. W. BECKETT  3,273,596
HYDRAULIC PULSATION ABSORBER
Filed Sept. 3, 1963  2 Sheets-Sheet 1
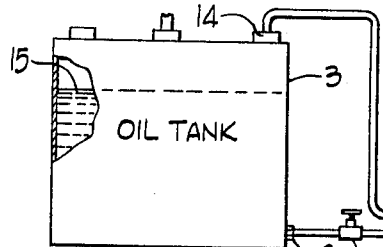
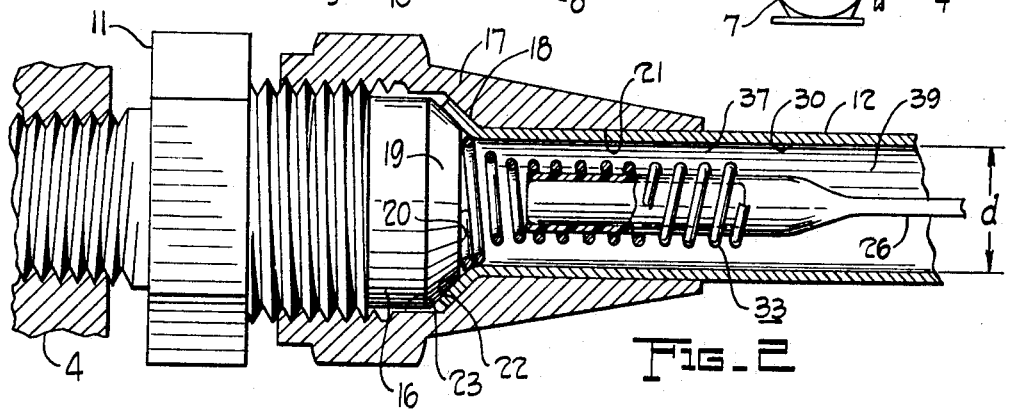
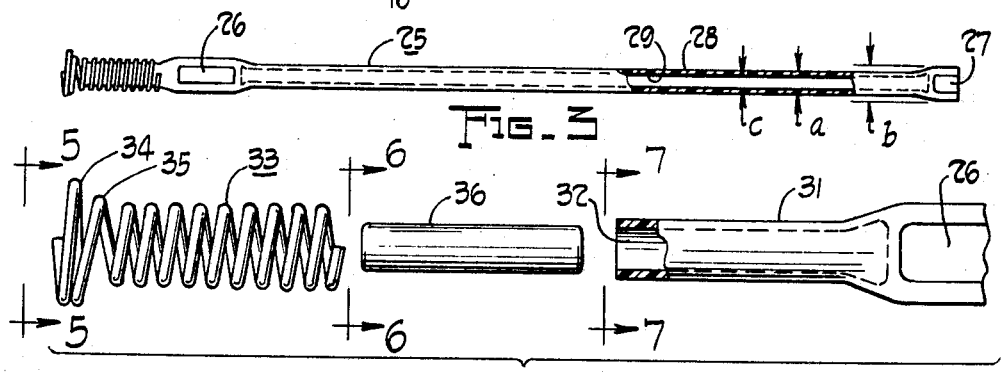
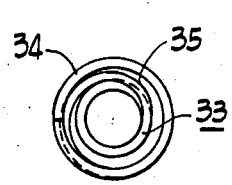
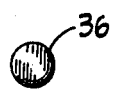
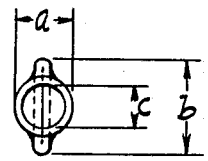
INVENTOR.
REGINALD W. BECKETT
BY Bosworth, Sessions,
Herrstrom and Knowles.
ATTORNEYS.

Sept. 20, 1966  R. W. BECKETT  3,273,596
HYDRAULIC PULSATION ABSORBER
Filed Sept. 3, 1963  2 Sheets-Sheet 2
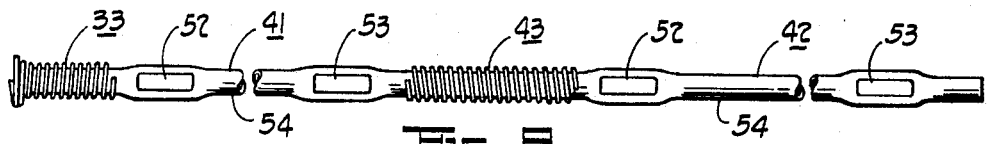
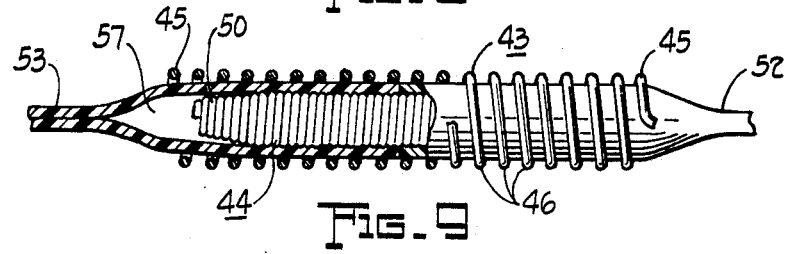
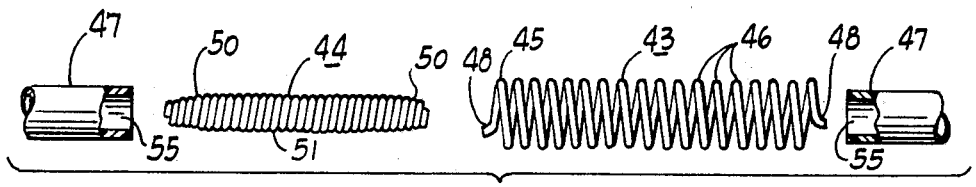
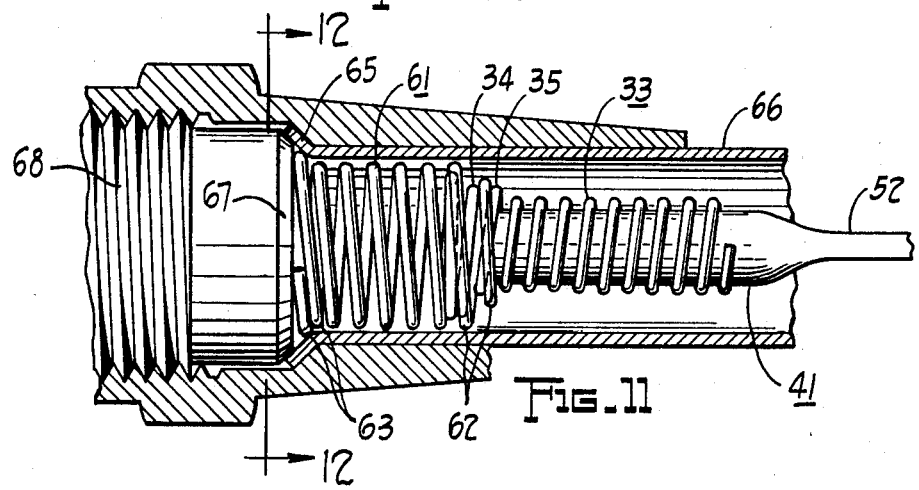
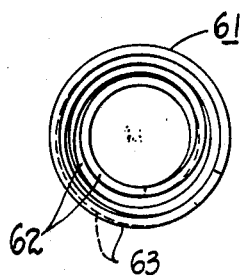
INVENTOR.
REGINALD W. BECKETT
BY Bosworth, Sessions,
Herrstrom and Knowles
ATTORNEYS.

United States Patent Office 3,273,596
Patented Sept. 20, 1966

3,273,596
HYDRAULIC PULSATION ABSORBER
Reginald W. Beckett, Elyria, Ohio; Mildred Jean Beckett, executrix of said Reginald W. Beckett, deceased
Filed Sept. 3, 1963, Ser. No. 306,243
7 Claims. (Cl. 138—30)

This invention relates to pulsation absorbing devices for use in hydraulic systems, more particularly to such devices for suppressing high frequency vibrations of the type that cause audible disturbances such as humming in liquid distribution systems.

It is known that hydraulic systems of the type in which a liquid is pumped through conduits often develop objectionable vibrations; such vibrations are of various magnitudes and frequencies depending upon the geometry of the conduits and other components, particularly the speed and type of pump employed. Vibrations in the audible range are especially objectionable because they create an annoyance in the environment in which people live and work. Various schemes and devices have heretofore been used for the purpose of suppressing the vibrations and minimizing the annoyance. It is well known, for example to provide an air chamber in a fluid system for the purpose of absorbing pulsations, the air chamber constituting a cushion which alternately absorbs and releases the energy of the pulsations. In order to provide such an air chamber, structural arrangements of elaborate character have been designed. Because of the complexity of previous vibration absorbing devices, they are too bulky and costly for general use.

In pumping systems such as those associated with oil burners, the humming of the conduits and other components is particularly objectionable because of the customary proximity of such systems to persons seeking sleep, rest and relaxation. Vibrations and pulsations generated at the circulating pump are made complex by the different transmission rates of the media involved. The brass or copper tubing of the system transmits the audible vibrations at a speed of about 11,000 feet per second at the temperatures normally encountered, whereas the oil being pumped has at the same temperatures a sound transmission rate only about one third that of the metals referred to; the iron or cast steel of the fuel oil pump transmits sound at over 16,000 feet per second. Thus the resultant sound is complex and comprises many overtones and harmonies, some of very high frequency. According to the present invention it is sought to absorb and dampen the pulsations in liquid pumping systems of the character referred to, particularly those pulsations and vibrations that are in the upper ranges of audible frequencies, by providing cushion means distributed lengthwise along the tubing of the liquid system so that each traveling wave and pulsation is damped a substantial distance lengthwise along its path of travel in the liquid.

The purpose and principal object of the present invention is to provide inexpensive vibration and pulsation suppression means for hydraulic systems. The invention contemplates a specialized cushion device useful and adapted to be inserted in existing as well as new hydraulic systems of the type having tubing containing liquid or through which liquid flows. Thus, as a specialized objective of the invention it is sought to provide a pulsation absorbing device useful and that can be inserted in and, if desired, removed from the tubing of existing hydraulic systems with minimum trouble and expense and without altering or injuring the tubing in any way.

Another object is to provide a device of the character referred to which comprises elongated tubular cushion means of resilient deformable material suitably sealed at points spaced along its length in the provision of one or more internal chambers so that insertion of the cushion means in the tubing of a hydraulic system for which it is designed, with an intervening clearance between the internal walls of the tubing and the tubular cushion means, provides the desired vibration absorbing characteristics in the system.

Another object is to provide such a device which, in combination with the liquid holding tubing in which it is placed in use, provides a liquid passage or chamber having a high ratio length dimension to maximum transverse or width dimension; more particularly, to provide for use in the distribution tubing of a liquid pumping system, a cushion device which has a length in the direction of vibration travel which is many times its width or transverse dimension and many times the width or transverse dimension of the liquid path.

Another object is to provide a tubular cushion device of the character mentioned having a gas filled chamber; more specifically a chamber adapted to be easily filled with an inert gas under pressure slightly greater than that of the liquid in which the device is intended to be immersed in use.

Another object is to provide in combination with an elongated resilient tubular cushion means, a retainer for locating and holding it in predetermined position within a tubular member of a hydraulic system. More particularly, the invention provides a retainer comprising a body portion which, without the use of special tools or equipment, is adapted to be made fast to the cushion means, preferably as by merely embracing the latter, and a holding portion which is adapted to secure itself to the tubing of the hydraulic system, as by engagement with an interior surface of the tubing or by being made captive between readily separable parts of such system. As a specialized version of this aspect of the invention the retainer comprises a helical coil spring wire with a body portion of less diameter than the tubing in which the pulsation absorber is intended for use and adapted to be screwed onto the cushion means and with an enlargement adapted to engage and be held by the tubing of the hydraulic system.

A further object is concerned with the provision of coupling means for joining together in end to end relation a number of resilient deformable cushions of the character referred to. In particular it is sought to provide a coupling for joining the ends of tubular cushions without modification of or injury to such ends, which coupling is of minimum transverse dimension and comprises a minmum number of simple inexpensive parts.

A still further object is to provide for a pulsation absorber device having a retainer of the type referred to, an adapter which permits use of the device in hydraulic tubing larger in diameter than that for which the particular retainer was designed. In particular this aspect of the invention is concerned with an adapter in the nature of a transition element which has a relatively small or convergent portion for interlocking with the retainer and a relatively large or flared or divergent portion for engaging the larger hydraulic tubing mentioned. More especially the transition adapter element contemplated is in the form of a helical coil wire spring having on its opposite ends the convergent and divergent portions described, the resilient cushion of the device being receivable axially through the adapter coil with the enlargement of the retainer engaged against and held by the converging end portion of the adapter spring element and with the diverging end portion of such adapter spring element receivable between the end of such larger tubing and the companion part of the hydraulic system in lieu of the retainer enlargement.

Other objects and adavantages of the invention relate to certain details of construction and combinations and arrangements of parts which are apparent in the following description made in connection with the accompanying drawings showing preferred embodiments of the invention representing the best known mode of practicing the invention.

In the drawings:

FIGURE 1 is an elevational layout, partly schematic, showing a pressure atomizing oil burner and a liquid fuel tank connected by tubing and comprising a liquid circulating system of the type intended to be equipped with a hydraulic pulsation absorber embodying the principles of the present invention, such absorber device in any event being completely enclosed and hidden from sight;

FIG. 2 is a longitudinal sectional detail enlarged to more than full size showing one of the tube fittings of the system of FIG. 1 and portions only of the pump and tubing connected thereby, this figure also showing a portion of the hydraulic pulsation absorber;

FIG. 3 is an elevational view of the pulsation absorber partly in section and with parts removed, this view being reduced in scale relative to FIG. 2 and being substantially full size;

FIG. 4 is an exploded elevational view substantially the same scale as FIG. 2, showing components of the pulsation absorber at its anchorage end;

FIG. 5 is an end view of the helical coil retainer fitting, this view being taken substantially in the plane represented by the line 5—5 of FIG. 4;

FIG. 6 is an end view of the retainer plug, this view being taken substantially in the plane represented by the line 6—6 of FIG. 4;

FIG. 7 is an end view of the cushion tube showing the connector portion, this view being taken substantially in the plane represented by the line 7—7 of FIG. 4;

FIG. 8 is a foreshortened elevational view scaled similarly to FIG. 3 showing a modified pulsation absorber comprising a series of two cushion tubes arranged end to end and joined by a specialized coupling;

FIG. 9 is a fragmentary elevational view, partly in section and with parts broken away and removed, showing the joint by which the adjacent tubular cushions of FIG. 8 are connected, this view being enlarged relative to FIG. 8;

FIG. 10 is an exploded elevational view of the components embodied in the joint of FIG. 9, this view being reduced in scale relative to FIG. 9;

FIG. 11 is a fragmentary elevational view, partly in section showing a transition fitting for adapting a pulsation absorber having a retainer designed for use in tubing of relatively large size; and FIG. 12 is an end view of the transition fitting of FIG. 11, this view being taken substantially in the plane represented by the line 12—12 of FIG. 11.

The pulsation absorber of the present invention is particularly useful and effective in suppresing high frequency vibrations such as are produced by rotary pumps of the type used in fuel systems of pressure atomizing oil burners.

An oil burner such as shown at 1 (FIG. 1) is mounted in wall 2 of a conventional heater or furnace and receives fuel from a suitable storage tank 3 located at a remote point. The oil burner includes a rotary pump 4 which forces the liquid fuel oil to a nozzle (not shown) the fuel being projected from the nozzle in the form of a spray which issues from burner head 5 and burns in the combustion chamber of the heater. A transformer 6, constituting part of the oil burner, provides suitable high tension electrical current for spark ignition. The pump 4 has an inlet fitting 7 to which is connected feed or suction tubing or line 8; the remote end of the feed line is connected through manual valve 10 and fitting 9 to a low point of the oil supply tank 3. In a so-called one-pipe fuel supply system, the pump 4 is provided with internal passages which permit recirculation within the pump casing of pumped fuel oil in excess of that discharged through the pressure atomizing nozzle of the burner. In a so-called two-pipe fuel supply system, illustrated in FIG. 1, an outlet fitting 11 in the body of the pump 4 (which may be the same type of pump as that used in a one-pipe system) is connected by tubing 12 to a fitting 14 in the top of the oil tank 3. The tubing 12 thus constitutes a return line through which pumped oil, in excess of that used by the burner, is returned to the storage tank at a point above the fuel level, indicated at 15. A typical domestic oil burner fuel system such as that represented in the drawings employs feed and return lines 8, 12 of ⅜ inch outside diameter copper tubing. The pump 4 will pass up to about 20 gallons of fuel oil per hour, returning to the storage tank 3 through the return line 12 that oil which is not discharged through the burner nozzle. Thus the return tubing 12 is carrying oil at high velocity, usually upwards of at least about 10 gallons per hour. Pulsations originating at the pump 4 are thus likely to be carried by the high velocity oil and transmitted to the tubing and other components of the system. Hence the vibration and pulsation absorber of the present invention is particularly suited for use in the fuel supply system of oil burners, for insertion in the copper tubing which conventionally is connected to the pump by screwed fittings of separable parts. In the case of a one-pipe system, the pulsation absorber is installed in the feed line 8 at the fitting 7. In a two-pipe system the pulsation absorber is located in the return line 12 at the fitting 11.

As shown, in FIG. 2, the pump return line fitting 11 is screwed into the body of the pump 4 and has an externally threaded nipple 16 which receives an internally threaded sleeve 17. The tubing 12 has a flared end 18 which mates with tapered or frusto-conical end 19 of the nipple 16. The tapered sleeve 17 is formed with a main bore 21 that has a sliding fit over the tubing 12, frusto-conical shoulder 22 being located between the main bore 21 and the counterbore 23.

The pulsation absorber is shown apart from the tubing of the hydraulic system in FIG. 3. It comprises an elongated tube 25 of resilient deformable material such as a synthetic rubbery polymer imprevious to and not affected by the oil or liquid used in or with which the particular hydraulic system is charged. For use in the fuel supply system of a pressure atomizing burner, the cushion tube 25 advantageously comprises a suitable synthetic material such as a theromplastic vinyl polymer, for example, polyvinyl chloride compounded to exhibit physical characteristics such as those of conventional surgical rubber tubing. It is formed as by extrusion through the orifice of a conventional auger machine with an outside diameter (indicated at "$a$") of ³⁄₁₆ inch and an inside diameter (indicated at "$c$") of from .131 inch to .134 inch, the wall thickness being about .026 inch or .027 inch. Desirably, an inert gas such as nitrogen is fed into the tubing as it issues from the extrusion nozzle. The inert gas is supplied to the interior of the tubing as through the core of the extrusion nozzle at a pressure slightly above atmospheric, just sufficient to prevent collapse of the heat softened tubing walls.

At its ends the soft tube comprising the pulsation absorber 25 has seals 26, 27 providing a hermetically sealed internal chamber 29. These seals may be provided by inserted plugs cemented in place and in other ways which will be apparent to those skilled in the rubber and plastics art. A preferred method of sealing the cushion tube ends is to effect a localized collapsing of the tube walls while they are in heat softened condition. The polymer compound of which the cushion tube is made, being a thermoplastic material, bonds together where the walls are squeezed. The collapsing is done, preferably automatically, while the tubing is traveling away from the extrusion nozzle by which it is formed. Suitable means such as a pressure element acting against an anvil or a pair of opposed fingers is arranged to pinch together the tubing walls at periodic intervals as the extrusion proceeds. The heat softened thermoplastic material comprising the opposed walls adheres together and the walls are united in an integral seal at each pinch zone, the seals being spaced along the tubing as desired to provide the seals 26, 27. Each seal has an axial extent greater than the diameter of the normal tube and may have length twice the tube dimeter. The extruded cushion tube material, with the axially spaced seals described, is cooled in the usual manner as by a water bath.

The sealing of the continuously formed thermoplastic tube is done at unequal intervals and the severing of the sealed tube is so done in relation to the seals as to provide each length of the cushion tubing with a connector portion 31 integral with the main or body portion; the seal 26 is located between the connector and body portions of the cushion tube and the seal 27 is at the end of the tube remote from the connector portion. Thus in pinching the heat softened tube as it comes from the extruder in production to provide the seals 26, 27, the pinching is done at irregular intervals so that the tube can then be cut without waste into even lengths by an automatic cutter operating in timed relation to the travel of the extruded pinched tubing. For example, in the sealing operations on the extruded tubing, a pair of the seals 26 may be formed adjacent to one another, separated by a distance about twice the length of the connector portion 31. Between successive pairs of the seals 26 there is formed a single seal twice the length of the seal 27 shown in the drawings. In the unsevered condition of the extruded tube, successive cushion tube lengths are thus head to tail. In the subsequent severing operations the sealed tubing is cut through the midpoint of the single seal, providing two of the end seals 27, and is cut midway between the paired seals 26, providing open ends 32 into the integral connector portions 31.

In its unstressed condition the connector portion 31 of the cushion tube has an internal diameter slightly less than the external diameter, .135 inch, of a cylindrical $9/16$ inch long expander plug 36. The plug has rounded ends formed by tumbling and is pressed into the chamber of the connector portion through open end 32 of the latter. A retainer sleeve 33 which comprises a helical spring metal wire coil is then placed over the connector portion 31. For use with the cushion tube 25 of $3/16$ inch outside diameter, described above, the retainer 33 is made of suitable corrosion resistant material such as stainless steel spring wire or black oxide coated music wire, .029 inch in diameter. Throughout the major or body portion of its axial length the retainer 33 has convolutions of uniform diameter and spacing so that the retainer can be readily screwed onto the connector portion 31 of the tube in assembly; the diameter of the cylinder generated by the inside of the coil spring is .185 inch, slightly smaller than then $3/16$ inch external diameter of the circular sectioned tubing connector portion 31.

At its outer or left end, as viewed in FIGS. 2–4, the retainer 33 is flared, being formed with at least a single turn or convolution 34 which is of larger diameter than the uniform turns which comprise its body portion. The retainer has one or more tapered turns 35 which connect the uniform diameter body turns to the relatively large diameter end turn 34.

The plug 36 distends the tube so that the external surface of the latter is maintained in strong frictional contact and interlocked with the surrounding body portion of the retainer 33.

As shown in FIG. 2, the diameter of the cylinder generated by the external elements of the body portion of the retainer 33 is less than the internal diameter of the tubing 12 of the hydraulic system in which the vibration absorber is installed. There is thus provided, surrounding the connector portion 31 and the retainer 33 an annular clearance 37 through which the liquid or fuel oil travels. The external diameter of the large turn 34 of the retainer is greater than the internal diameter of the tubing 12 so that when the absorber device is inserted axially into the tubing through the open end of the latter the retainer large turn is compressed and held by frictional engagement with the tubing wall or, as shown, the large diameter turn 34 engages the tapered internal surface of the flared end 18; the latter thus constitutes a stop and the large turn 34 constitutes a holding portion of the retainer 33 interlocking or otherwise securing the vibration absorber device in the tubing in which it is installed and automatically locating it in predetermined axial position. The holding portion or turn 34 of the retainer preferably is located axially beyond the end face 20 of the nipple 16 so that the holding turn does not interfere with the seal between the nipple 16 and the flared end 18 of the return line tubing. In other types of liquid systems such as one having a compression type fitting in lieu of the flared fitting shown, the large end turn 34 of the retainer resiliently engages the internal surface of the liquid tubing and seats against an internal shoulder of the tubing which results from the compression, or is held frictionally, circumferentially compressed by the tubing wall. The spaces between the coil convolutions 34, 35 allow free flow of liquid through the tubing.

The vibration absorber 25, because of its flexibility, can be inserted in existing hydraulic and fluid systems as well as in new systems; it readily conforms to bends, such as the return line bend indicated at 38 in FIG. 1. Along the length of the device and continuous with the clearance 37 at the anchorage end of the device there exists a clearance 39 between the internal surface 30 of the tubing 12 and the soft, external surface 28 of the tube 25. The clearance 39, which generally surrounds the tube 25, may vary in shape depending upon the lateral position of the tube within the return line tubing 12.

Vibrations such as high frequency pressure pulsations generated at the pump 4 are transmitted through the fuel oil and the tubing, resulting in audible sounds such as objectionable storage tank hum and the humming of conduits and return line tubing encountered in oil burner installations of the type described. By alternately absorbing and releasing the energy of the pulsations the hollow cushion tube 25 deadens the sound, substantially eliminating the humming. In the example described the cushion tube 25, has a length which is many times greater than its diameter. The copper return line 12, of $3/8$ inch external diameter, has an internal diameter of about $5/16$ inch; the cushion tube 25 is a polyvinyl tube having an external diameter of $3/16$ inch and a length of 6 inches. Thus a length-to-diameter ratio of 32:1 is provided. It has been found that a lesser length-to-diameter ratio, such as of the order of about 20:1, can be used. However, it is preferable to have a length-to-diameter ratio of at least about 25:1. The cushion tube 25 may be other than circular in cross section; in such case its maximum transverse dimension is to be considered in lieu of diameter as set forth in the foregoing expressions concerning length-to-diameter ratio. Thus, in the case of a cushion tube elliptical in cross section, its maximum transverse dimension is that of the major axis of the ellipse; a square or rectangular sectional tube has a maximum transverse dimension represented by the diagonal of the square or rectangle.

The external diameter "$a$" of the cushion tube body desirably is made only enough smaller than the internal diameter "$d$" of the tubing 12 for which it is designed to provide the clearance 39 necessary to accommodate the liquid flow intended at an acceptable pressure drop. The relationship is conveniently expressed in terms of surface area per unit length in order to take into account cushion tubes of non-circular cross section. In the example given, the tubing 12 has a nominal internal diameter "d" of 5/16 inch and the cushion tube 25 has a nominal outside diameter of 3/16 inch, which gives a surface area ratio of about 5:3. However, it is satisfactory to use a cushion tube 25 of 3/16 inch outside diameter in a system having tubing 12 as large as 1/2 inch external diameter, 7/16 inch internal diameter. Thus the surface area ratio of the interior of the tubing to the outside of the cushion tube may be as large as, but preferably is no greater than about 7:3.

In pinching the cushion tube to form the seals 26, 27 the tube is locally flattened, as shown in FIG. 7, the flattening increasing the lateral width of the tube from its normal outside diameter "a" to its flat width "b". In order to be able to insert the vibration absorber device easily into the tubing of the hydraulic system the dimension "b" of the flat seals 26, 27 is not greatly in excess of the internal diameter "d" of the such tubing, preferably, is slightly less than the inside diameter of the tubing into which the device is to be inserted.

In FIGS. 8–10 is illustrated a modification in which a plurality of soft, deformable cushion tubes, 41, 42, similar to and formed by extrusion as described in connection with the cushion tube 25, are joined in an end-to-end series to provide a vibration absorber having a high length-to-diameter ratio. For example, with tubes 41 and 42 each having a cushion chamber with an effective length of 18 inches and an external diameter of 3/16 inch a tandem or series arrangement is provided in which each unit has a length-to-diameter ratio of 96:1. Higher ratios of length-to-diameter are obtained by using longer tubes and by assembling more than two of the cushion tubes in the end-to-end series relation shown.

The joining together of the cushion tubes is effected in any suitable manner, the drawings illustrating a joint comprising an external helical spring wire coupling coil 43 and an internal coupling plug 44 which also may comprise a helical spring wire coil.

The coupling coil 43 for 3/16 inch cushion tubes 41, 42 is made of 18-8 stainless steel wire type 302, .029 inch diameter. It comprises right hand convolutions that are of substantially uniform diameter except for endmost turns 45 which preferably are of slightly larger diameter than central turns 46 in order to facilitate inserting ends 47 of the cushion tubes 41, 42 in assembling the joint. End portions 48 of the coupling coil 43 are bent slightly or kicked outwardly and axially about 1/64 inch away from the regular lay of the adjacent turns of the coil to eliminate the possibility of the coil ends digging into the plastic material of the cushion tube ends and also to facilitate starting of the threading of the cushion tubes into the coupling coil. The clear inside diameter of the coupling coil is .180 inch to receive the 3/16 inch cushion tubes described.

The coupling plug 44 comprises a left hand helical spring wire metal coil of 18-8 stainless steel, type 302, .020 inch diameter in the example described. It has central body turns, or convolutions 51 of substantially uniform outside diameter .132 inch and tapered convolutions 50 at each end. All of the turns or convolutions of the coupling plug 44 are laid up in side-by-side contacting relation, preferably with negative pitch so as yieldingly to resist separation. The coupling coil 43 and the coupling plug 44 are formed with opposite twist to resist unscrewing; that is, the twisting of the coupling coil 43 is such that in screwing it onto one of the cushion tube ends 47 the relative rotation is opposite that for screwing the coupling plug 44 into the corresponding tube end.

As shown in FIG. 9, the coupling coil 43 is of greater axial length than the coupling plug 44, the outer coil constituting an armor for the tube end portions 47 and protecting the latter should bending or twisting occur in storage, transit or installation. The tapered ends of the coil plug 44 may be separated by spaces 57 from the seals 52, 53.

The cushion tubes 41, 42 are formed with axially spaced seals 52, 53, similar to the seals 26, 27 described in connection with the preceding figures. However, both seals of each of the cushion tubes 41 and 42 are spaced from the tube ends so as to provide a connector portion 47 on each end. These connector portions correspond to the connector portion 31 formed on one end of the cushion tube 25, being of the same nominal external diameter as body portions 54 of the tubes. Each of the connector portions 47 comprises a pocket which has an open end 55 for insertion of a filler or coupling plug.

Although FIG. 8 shows a series of only two cushion tubes 41, 42 it is contemplated that the series will be extended, as desired, by joining additional cushion tubes of the same construction as the tubes 41, 42; the joining is effected by joints corresponding to that shown in FIGS. 8 and 9 employing coupling plugs 44 or both coils and plugs.

In FIGS. 11 and 12 is illustrated an adapter or transition fitting 61 which is useful in securing the pulsation absorber of the present invention in a liquid conduit or tubing of larger diameter than that for which the particular retainer coil is designed. The transition fitting, 61, comprises a helical spring wire open coil having at one end several turns, 62, which progressively decrease in diameter, and on the other end several turns 63 which progressively increase in diameter. The smallest of the tapered end turns 62 closes on itself and has an internal diameter sufficiently large to permit the cushion tube to pass or be threaded through the transition fitting in assembly. Preferably the smallest of the end turns 62 has an internal diameter only sufficiently large to clear the body portion of the retainer 33. The closing of the end turn prevents slipping through of the flared end 34 of the retainer collar 33. Also, the transition fitting is wound or twisted in a direction opposite the retainer sleeve 33 for the same purpose. The single large end turn 34 and the tapered turns 35 of the retainer 33 engage behind the tapered turns 62 of the transition fitting, the latter constituting a shoulder to provide an interlock which prevents further movement and separation of the coils. The internal diameter of the convolutions comprising the body of the transition fitting 61 is larger than the external diameter of the single end turn 34 of the retainer 33 so that the latter is readily assembled into the transition fitting. The increased diameter end turns 63 of the transition fitting 61 correspond to the tapered and large diameter end turns 34, 35 of the retainer collar 33. The turn or turns 63 of the transition fitting are locatingly received and held by an interlock between the flared end 65 of liquid tubing 66 and frusto conical end 67 of fitting 68. The tubing 66 and the fitting 68 correspond to but are larger than the tubing 12 and the fitting 11 of FIG. 2.

One of the advantages of the transition fitting 61 is that the single cushion tubes 25 and the tandem or series cushion tubes 41 and 42 can be standardized in production and used in liquid systems having tubes of various internal diameters. It is necessary merely to provide a transition fitting 61 having the increased diameter end turn 63 of appropriate diameter to be interlockingly engaged by the fitting of the particular hydraulic line being equipped with the pulsation device of the present invention.

For example, the cushion tubes 25 are 3/16 inch outside diameter polyvinyl flexible extrusions and the retainer collars are proportioned to secure them in standard 3/8 inch outside diameter copper tubes having standard flared fittings. The transition fittings 61 are sized to be received and held in standard 1/2 inch copper tubes and fittings and to interlock with the 3/16 inch cushion tubes. The open character of the coils comprising the fittings 33 and 61 allows flow of the liquid through the tubing in which the devices are installed substantially without objectionable impedance.

The present invention thus provides a pulsation absorber for use in various hydraulic systems. The device is essentially an energy absorbing and damping cushion adapted to be inserted into a conduit containing liquid which is subjected to pulsations or vibrations. The cushion is easily and economically manufactured using mass production techniques. Because of the flexibility of the cushion tube, it can be inserted into existing hydraulic lines without modification or alteration of such lines. It can be assembled as a unit comprising a plurality of individual cushion tubes for use in tubing of larger internal diameter than that for which any one of the individual tubes is designed. By locating the device at a joint comprising separable parts, it can be readily removed, inspected and replaced.

In accordance with the provision of the patent statutes, the principles of the present invention may be utilized in various ways, numerous modifications and alterations being contemplated, substitution of parts and changes in construction being resorted to as desired, it being understood that the embodiments shown in the drawing and illustrated above is given merely for purposes of explanation and illustration without intending to limit the scope of the claims to the specific details disclosed.

What is claimed and desired to be secured by United States Patent is:

1. In a hydraulic system having a conduit having a diameter of the order of 3/8 to 1/2 inch and a pump connected to the conduit, operation of the pump producing sonic vibrations in the audible frequency range in the liquid and the conduit, a device for dampening said vibrations and rendering them substantially inaudible comprising a cushion member in the form of an elongated tube composed of a resilient deformable elastomeric material sealed at spaced points to provide a closed elongated cushioning chamber, said cushioning chamber containing a gas at approximately atmospheric pressure, the outer diameter of the tube being such as to provide a clearance between the exterior of the tubular cushion member and the interior of the conduit, and means for resiliently mounting the cushion member in the conduit adjacent the point of attachment of the conduit to the pump.

2. A device according to claim 1 in which the length-to-diameter ratio of the cushioning chamber is at least 25 to 1.

3. A device according to claim 1 in which the tube has an outside diameter of about 3/16 inch.

4. A device according to claim 3 in which the cushioning chamber has a length of at least about 18 inches.

5. A device according to claim 1 in which the means for securing the cushion member in the conduit comprises a plug disposed in a portion of the tube beyond one of the sealed points and a spring wire coil surrounding said plugged portion.

6. A device according to claim 1 comprising a plurality of elongated cushion members joined in an end-to-end series.

7. In combination in a hydraulic system of the type having tubing containing liquid, an elongated tubular cushion member of resilient deformable material having a sealed gas filled chamber and a two-part fitting for locating the cushion member in the system, one part of said fitting comprising a coil spring having a holding portion embracing the cushion member and, at one end of the holding portion, a retaining portion larger than the holding portion, and the other part of said fitting comprising a coil spring having in one of its ends an axial opening larger than the holding portion and smaller than the retaining portion of said one part and, at the other of its ends, a locating portion larger than the said retaining portion, the tubular cushion member and the holding portion of the one part being axially receivable through the other part in assembly with the retaining portion engaging inside the one end of the other part to limit movement of the parts axially relative to one another, and the locating portion of said other part being engageable with the tubing automatically to locate the fitting and the cushion member in axially fixed positions in the system.

References Cited by the Examiner

UNITED STATES PATENTS

| | | | |
|---|---|---|---|
| 1,668,315 | 5/1928 | Hein | 285—133 X |
| 2,200,082 | 5/1940 | Guarnaschelli | 285—133 |
| 2,430,995 | 11/1947 | Roos | 229—48 X |
| 2,583,900 | 1/1952 | Spence | 285—398 X |
| 2,599,325 | 6/1952 | Fritzberg | 138—28 |
| 2,629,402 | 2/1953 | Cook | 138—28 |

FOREIGN PATENTS

| | | |
|---|---|---|
| 392,769 | 10/1908 | France. |
| 539,524 | 11/1931 | Germany. |
| 851,288 | 10/1952 | Germany. |
| 120,218 | 11/1918 | Great Britain. |
| 730,582 | 5/1955 | Great Britain. |

LAVERNE D. GEIGER, *Primary Examiner.*

LEWIS J. LENNY, *Examiner.*

C. HOUCK, *Assistant Examiner.*